United States Patent
Mizioch et al.

(10) Patent No.: US 9,611,968 B2
(45) Date of Patent: Apr. 4, 2017

(54) SECURITY LID

(71) Applicant: Gregory J. Mizioch, Scottsdale, AZ (US)

(72) Inventors: Gregory J. Mizioch, Scottsdale, AZ (US); Robert C. Berlese, Scottsdale, AZ (US)

(73) Assignee: Gregory J. Mizioch, Scottsdale, AZ (US)

( * ) Notice: Subject to any disclaimer, the term of this patent is extended or adjusted under 35 U.S.C. 154(b) by 574 days.

(21) Appl. No.: 13/886,570

(22) Filed: May 3, 2013

(65) Prior Publication Data
US 2014/0374421 A1    Dec. 25, 2014

(51) Int. Cl.
*F16L 55/11* (2006.01)
*F16L 55/115* (2006.01)

(52) U.S. Cl.
CPC .............. *F16L 55/11* (2013.01); *F16L 55/115* (2013.01); *F16L 55/1125* (2013.01); *F16L 55/1157* (2013.01)

(58) Field of Classification Search
CPC ...... F16L 55/11; F16L 55/115; F16L 55/1157; F16L 55/1125
See application file for complete search history.

(56) References Cited

U.S. PATENT DOCUMENTS

| | | | | |
|---|---|---|---|---|
| 4,074,941 A | * | 2/1978 | Jablonski | F21V 21/116 248/219.2 |
| 4,513,788 A | * | 4/1985 | Coker | F16L 55/1157 138/89 |
| 4,921,123 A | * | 5/1990 | Mizioch | F16L 45/00 138/89 |
| 5,439,130 A | | 8/1995 | Waugh | |
| 5,778,934 A | * | 7/1998 | Campbell | F16L 55/115 138/89 |
| 6,029,709 A | * | 2/2000 | Burgess | F16L 55/11 138/89 |
| 6,073,792 A | | 6/2000 | Campbell et al. | |
| 6,286,553 B1 | * | 9/2001 | Morgan | F16J 13/08 138/89 |
| 6,488,440 B1 | * | 12/2002 | Hill | E02D 29/1427 404/25 |
| 6,584,734 B2 | * | 7/2003 | Mihalicz | E01C 23/06 404/25 |
| 2003/0201269 A1 | * | 10/2003 | Calder | F16L 55/136 220/328 |

* cited by examiner

*Primary Examiner* — Anthony Stashick
*Assistant Examiner* — James Way
(74) *Attorney, Agent, or Firm* — Cahill Glazer PLC

(57) ABSTRACT

A locking security lid incorporates a cylindrical housing having extendable pistons and contact pads for contacting the interior surface of an access pipe, the contact pads may be retracted to a withdrawn position wherein the contact pads are within the outside diameter of the cylindrical housing. The cylindrical housing is provided with a locking bolt to will be secured to the cylindrical housing through a stanchion and having a keyed bolt head to prevent removal of the locking bolt without a socket wrench having a corresponding slot pattern. The contact pads are provided with a locking interference surface to prevent relative movement between an access pipe and the contact pad when the contact pads are extended.

11 Claims, 2 Drawing Sheets

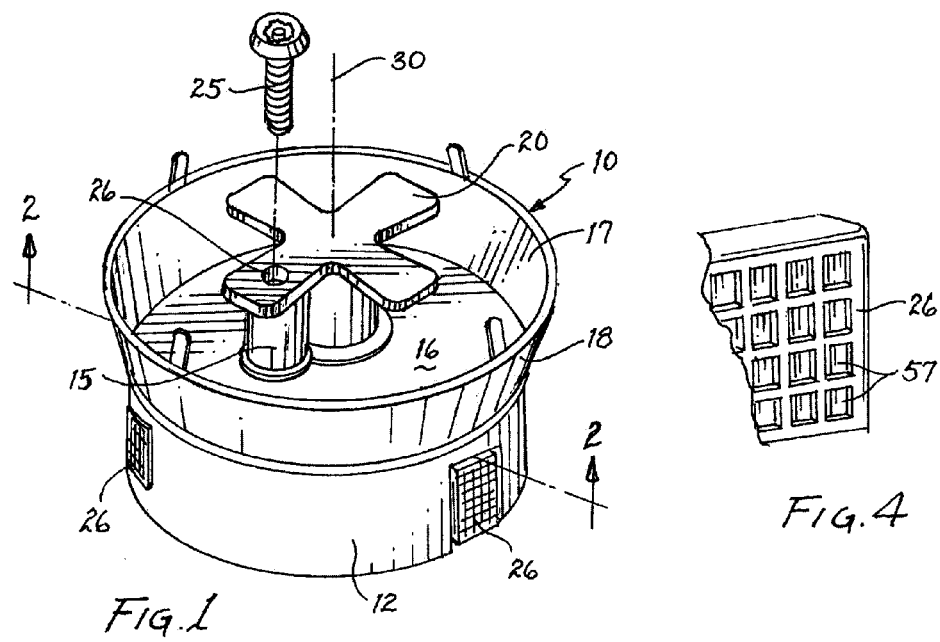
FIG. 1
FIG. 4
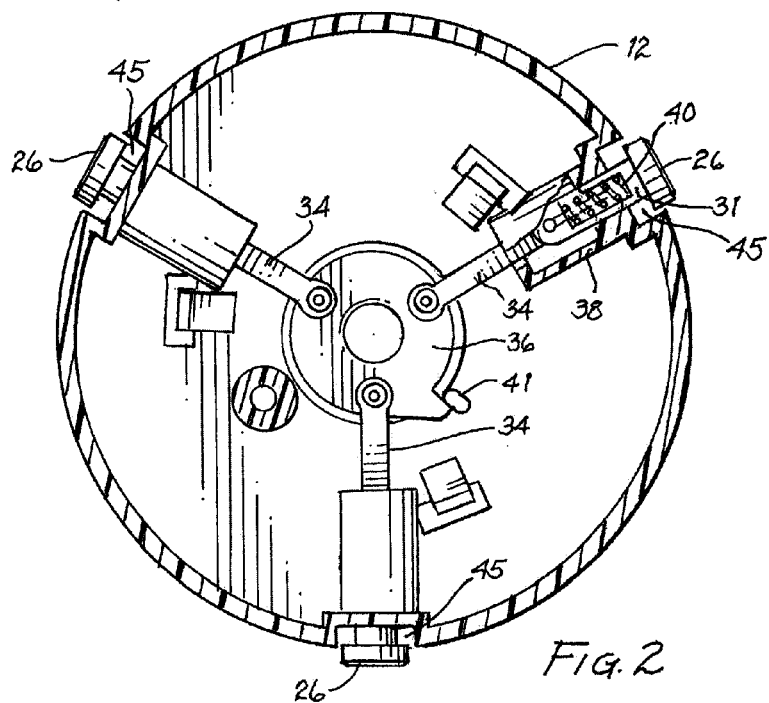
FIG. 2

SECURITY LID

FIELD OF THE INVENTION

This invention is directed to lids utilized to close and secure an access pipe to prevent unauthorized access to an underground shutoff valve.

BACKGROUND OF THE INVENTION

Underground utilities such as gas and water pipelines are dispersed in a variety of distribution patterns and grids with strategically located shutoff valves. These normally open valves can be closed to isolate designated sections of the pipe for repair, construction or testing. To obtain access to these valves, which are underground and positioned with corresponding utility pipeline, an access pipe is provided rising vertically from the vicinity of the valve to the surface of the ground. Thus, utilizing appropriate tools, authorized operators can gain access to the valves and open or close the valves as required.

To prevent unauthorized access to the valves, and to prevent such activities as vandalism, the access pipes are closed using a lockable lid that may be placed near the approximate ground surface level and locked in that position. The security lids may also provide protection to prevent debris and foreign material from entering the access pipe.

SUMMARY OF THE INVENTION

The present invention is directed to an improved security lid having a unique gripping and locking mechanism that may be more securely affixed in a locked position while providing versatility in the application of a lockable lid to access pipes of a range of internal diameters.

BRIEF DESCRIPTION OF THE DRAWINGS

The present invention may more readily be described by reference to the accompanying drawings in which:

FIG. 1 is a perspective view of a security lid constructed in accordance with the teachings of the present invention.

FIG. 2 is a top cross-sectional view of FIG. 1 taken along lines 2-2.

FIG. 4 is an enlarged view of a portion of a contact pad incorporated in the security lid of the present invention.

DETAILED DESCRIPTION OF THE INVENTION

Figure 3:
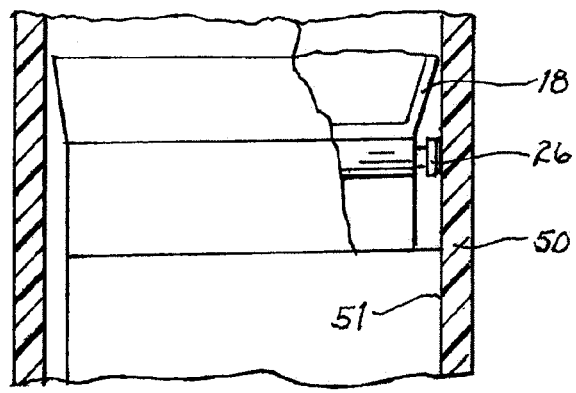
FIG. 3 is a schematic cross-sectional view of a portion of the security lid of the present invention installed in an access pipe.

Referring to FIG. 1, a perspective view of a security lid constructed in accordance with the teachings of the present invention is shown. The lid 10 incorporates a cylindrical housing 12 that may be molded from a suitable rigid plastic material such as ABS (Acrylonitrile Butadiene Styrene). The housing 12 may incorporate an integrally formed stanchion 15 extending upwardly from the upper surface 16 of the housing 12. A handle 20 is mounted on the housing 12 for rotation to permit an operator to fix the housing in position within an access pipe. The stanchion 15 provides a means for receiving a locking bolt 25 extending through an opening 26 provided in the handle 20 to lock the handle in position. The stanchion 15 is formed of similar ABS material and may be molded integrally with the cylindrical housing 12. The stanchion 15 is provided with a threaded cylindrical passage positioned centrally of the stanchion 15 to receive the locking bolt 25. The housing 12 is provided with an outwardly flared flexible skirt or collar 17 that forms a generally truncated conical shape to permit the outer edge 18 of the skirt 17 to contact the inner surface of an access pipe 50 (see FIG. 3) to temporarily seal the lid 10 in the access pipe 50 and prevent debris from passing the lid 10 downwardly into the access pipe 50.

The housing 12 is provided with a plurality of contact pads 26 that are positioned about the periphery of the housing and are mounted to be extended radially from the housing 12 into contact with the interior surface 51 of an access pipe 50. In the embodiment chosen for illustration, three contact pads 26 are provided positioned 120° apart about the central axis 30 of the cylindrical housing 12.

Referring to FIG. 2, a top cross-sectional view of FIG. 1 taken along lines 2-2, is shown. Each of the contact pads 26 forms an end of a corresponding piston 31 that is journaled to a connecting rod 34 pivotally secured to a drive plate 36. Each of the pistons 31 is movable radially within a cylinder 38 from a parked position to an extended position contacting the interior surface 51 of an access pipe 50. To accommodate variations in the diameter of an access pipe, and to accommodate the irregularities of the interior surfaces of an access pipe as well as to insure an appropriate contacting force, each of the pistons 31 is urged to an extended position by a corresponding compression spring 40. It may be seen by reference to FIG. 2 that rotation of the drive plate 36 in a clockwise direction (as viewed in FIG. 2) will result in the withdrawal of the corresponding connecting rods 34 and associated pistons 31. The contact pads 26 will then be withdrawn to their parked position wherein the contact pads 26 are positioned within the outer circumference of the cylindrical housing 12. Again referring to FIG. 2, it may be seen that rotation of the drive plate 36 in the counterclockwise direction will result in the extension of the connecting rods 34 and corresponding pistons 31 to the position shown in FIG. 2 wherein the contact pads 26 extend beyond the outer periphery of the cylindrical housing 12 and are available for contact with the inner surface 51 of an access pipe 50. A stop 41 is provided to limit the rotation of the drive plate 36. The drive plate 36 is connected to, and is rotated by an operator through the rotation of the handle 20 shown in FIG. 1. Each of the pistons 31 and corresponding contact pads 26 are positionable within wells or recesses 45 formed in the housing 12 to permit the retraction of the contact pads 26 entirely within the outside diameter of the housing 12. The length of the corresponding piston stroke, or the length of the connecting rods 34, can be increased to accommodate a greater range of access pipe diameters when the lid 10 is provided with wells or recesses 45 to permit the complete retraction of the contact pads 26 within the outside diameter of the housing 12.

The retraction of the contact pads 26 within wells or recesses in the cylindrical housing 12 is an important feature to overcome a disadvantage present in the prior art. Prior art locking lids, that incorporate contact pads, "park" their contact pads in a retracted position that is in contact with the outside diameter of the cylindrical housing. In this position, the locking lid may be inserted into an access pipe having a minimum diameter equal to the outside diameter of the cylindrical housing plus the additional diameter required to accommodate the contact pads parked against the outside diameter of the housing. That is, the locking lid of the prior art having contact pads cannot be used with access pipes having an internal diameter less than the diameter of a circle circumscribing the central axis of a cylindrical housing and having a radius equal to the length from that central axis to the outer surface of the corresponding contact pads. In practical terms, it thus requires additional series of sizes of locking lids to ensure that there is a locking lid corresponding to the range of access pipe internal diameters. The present invention extends the applicability of a cylindrical housing to a greater range of access pipe diameters since the contact pads 26 are retracted to within the outside diameter of the cylindrical housing 12 to thus permit the locking lid to be utilized on an access pipe having an inside diameter only slightly larger than the outside diameter of the cylindrical housing 12.

Figure 3A:
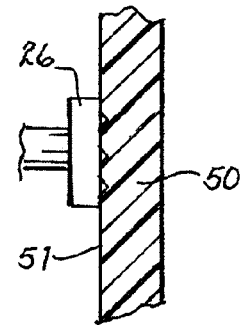
FIG. 3A is an enlarged view of a contact pad positioned against the interior surface of an access pipe.
Figure 5:
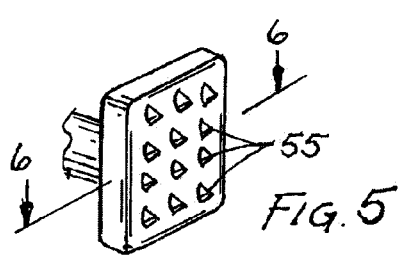
FIG. 5 is a perspective view of an alternate construction of a contact pad constructed in accordance with the teachings of the present invention.
Figure 6:
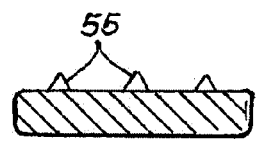
FIG. 6 is a cross-sectional view of the contact pad of FIG. 5 taken along lines 6-6.

Referring to FIGS. 3 and 3A, a schematic cross-section of a portion of an access pipe 50 is shown. It may be seen that the interior surface 51 of the access pipe 50, which is typically made of rigid plastic material such as PVC, is contacted by the skirt 17 extending upwardly from the cylindrical housing 12 to catch any debris falling on the lid 10 and retaining such dirt or debris on the top of the housing 12 to be retrieved at a later time when the lid is to be removed (such as when access to a valve requires removal of the lid). In the position shown in FIG. 3, the contact pad 26 is contact with the interior surface 51 of the access pipe 50 such as shown in FIG. 3A. In the embodiment shown in FIGS. 3 and 3A, the contact pad 26 is constructed of a material that is harder than the access pipe material. This harder material could be metal or a composition that is harder than typical PVC plastic of the access pipe. In the embodiment chosen for illustration shown in FIGS. 3A, 5, and 6, the contact pad 26 includes a plurality of locking points 55 arranged in a predetermined pattern. These locking points, constructed of metal or composite that is harder than the plastic of the access pipe, may partially temporarily penetrate the surface 51 of the access pipe to effectively "lock" the cylindrical housing 12 in position within the access pipe 50. It is possible under some circumstances to utilize single locking points in each contact pad rather than the pattern of the plurality of pads; the locking points do not necessarily have to create permanent penetration points on the interior surface of the access pipe, but may merely temporarily deform the surface sufficient to prevent relative movement of the contact pad and the access pipe. In this manner, the cylindrical housing 12 cannot be moved within the access pipe unless the corresponding contact pads 26 are withdrawn from contact with the interior surface 51 of the access pipe by rotation of the handle 20 and corresponding rotation of the drive plate 36 to withdraw the respective pistons 31 and contact pad 26 to their retracted position within the wells or recesses 45 and within the outside diameter of the cylindrical housing 12.

Another alternative form of the contact pad is shown in FIG. 4 wherein the contact pad 26 is made of a resilient material, such as a rubber compound, having a non-skid pattern 57 formed in the surface thereof. When the contact pad 26 is extended into contact with the interior surface 51 of the access pipe, the non-skid pattern 57 resists sliding movement between the contact pad 26 and the interior surface 51 of the access pipe. The action of the non-skid pattern is similar to that of an automotive tire resisting relative motion between a supporting surface and the tire tread.

When the cylindrical housing 12 is placed in position within an access pipe and is to be secured at that position, the handle 20 is rotated, thus rotating the drive plate 36, and extending the corresponding connecting rods 34 and pistons 31 radially outwardly until the contact pads 26 contact the inner surface of an access pipe. With the pistons 31 and contact pads 26 thus extended, the handle 20 may be locked in position by inserting a locking bolt 25 through the handle 20 into the central opening provided in the stanchion 15. As indicated previously, the stanchion 15 may be formed integrally with the cylindrical housing 12 and will receive the locking bolt 25 through the handle 20 to thus lock the handle in position with the contact pads in contact with the interior surface 51 of the access pipe.

Figure 7:
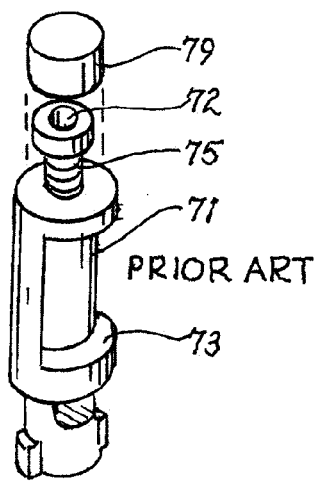
FIG. 7 is a partially exploded perspective view of a prior art locking device.
Figure 8:
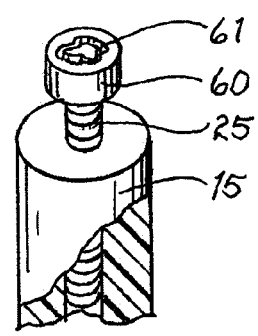
FIG. 8 is a partially sectioned perspective view of a locking bolt system incorporated in the security lid of the present invention.

Referring to FIG. 8, the locking bolt 25 incorporates a keyed bolt head 60 having a unique slot pattern 61 that will accept the insertion of only an identical patterned socket wrench. Thus, unauthorized persons will not be able to remove the keyed locking bolt to dislodge the secured lid. Prior art locking techniques included a hollow stanchion that would accept a device known in the art as a pin lock. A sample prior art pin lock 70 is shown in FIG. 7 wherein it may be seen that the pin lock 70 includes a steel barrel 71 positioned within a saddle 73 or frame that is inserted into a hollow stanchion. A locking screw 75 is inserted into the barrel (the locking screw is passed through a handle opening similar to that described in connection with FIG. 1) and the screw 75 is rotated and locked in position with a pin wrench (not shown) that extends into the central opening 72 of the locking screw 75. The wrench is thus utilized to remove the locking screw 75; the locking screw 75 is secured against unauthorized withdrawal unless the person attempting withdrawal has a corresponding pin wrench. This technique is satisfactory except that the central opening 72 of the locking screw 75 can easily collect dirt and debris preventing the pin wrench from being inserted in the screw. To correct this deficiency, prior art pin locks provide a dust cover 79 that the operator placed over the end of the locking screw 75 to prevent the collection of dirt and debris in the central opening. Unfortunately, in the field, dust covers are easily dislodged or sometimes the operator forgets to place the dust cover on the locking screw, and dirt and debris collect within the locking screw. Under such circumstances it is extraordinarily difficult to subsequently remove the locking screw thus requiring authorized personnel to expend substantial time to remove the lid for maintaining or operation of the subterranean valve. Such inefficiency is unacceptable to most utilities and municipalities. In contrast, the stanchion 15 of the present invention receives a locking bolt 25 having a keyed bolt head 60 that prevents unauthorized access to the subterranean valve and removal of the locking lid. The keyed bolt head 60 is nearly immune to the collection of dirt and debris, and to the extent dirt may accumulate within the slot pattern, it is easily brushed or blown from the pattern.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed:

1. A security lid for mounting within a cylindrical access pipe having an internal diameter comprising:
   (a) a cylindrical housing having an outside diameter less than said access pipe internal diameter and having a plurality of cylinders within and extending radially of said housing, each cylinder terminating at the periphery of the cylindrical housing and having a recess forming a well at said periphery;
   (b) a plurality of pistons, each mounted within a different one of said cylinders, respectively, for movement radially of said housing from a retracted position to an extended position; and
   (c) a plurality of contact pads each formed at an end of one of a different one of said pistons, respectively, and each radially moveable with a corresponding piston from a retracted position completely within a corresponding well and within said outside diameter of the cylindrical housing to an extended position outside said outside diameter of the cylindrical housing for contacting an interior surface of a cylindrical access pipe.

2. The security lid of Claim 1 wherein each of said pads is formed of a compressible material and each including a non-skid pattern formed in a contact surface thereof for contact with an inner surface of an access pipe.

3. The security lid of Claim 1 wherein each of said pads includes at least one locking point for contacting and temporarily deforming or penetrating an inner surface of said access pipe.

4. The security lid of claim 3 wherein said locking point is metal.

5. The security lid of claim 3 wherein said locking point is a plastic material harder than a material with which said access pipe is made.

6. A security lid for mounting within a cylindrical access pipe having an internal diameter comprising:
   (a) a cylindrical housing having an outside diameter less than said access pipe internal diameter and having a plurality of cylinders within and extending radially of said housing, each cylinder terminating at the periphery of the cylindrical housing and having a recess forming a well at said periphery
   (b) a plurality of pistons, each mounted within a different one of said cylinders, respectively, for movement radially of said housing from a retracted position to an extended position;
   (c) a plurality of contact pads each formed at an end of one of a different one of said pistons, respectively, and each radially moveable with a corresponding piston from a retracted position completely within a corresponding well and within said outside diameter of the cylindrical housing to an extended position outside said outside diameter for contacting an interior surface of a cylindrical access pipe;
   (d) a drive plate mounted for rotation about an axis;
   (e) a handle connected to said drive plate for rotating said drive plate;
   (f) a plurality of connecting rods pivotally connected to said drive plate;
   (g) each of said contact pads connected to a different one of said connecting rods, respectively, and mounted for reciprocating movement radially of said cylindrical housing in response to rotation of said drive plate;
   (h) a stanchion secured within said housing having a threaded bore; and
   (i) a locking bolt having a keyed bolt head extending through an opening provided in said handle and threaded into said threaded bore for locking said handle in position.

7. The security lid of claim 6 wherein said stanchion is formed integrally with said housing.

8. The security lid of claim 6 wherein each of said pads is formed of a compressible material each including a non-skid pattern formed in a contact surface thereof for contacting an inner surface of an access pipe.

9. The security lid of claim 6 wherein each of said pads includes at least one locking point for contacting and temporarily deforming or penetrating an inner surface of an access pipe.

10. The security lid of claim 9 wherein said locking point is metal.

11. The security lid of claim 9 wherein said locking point is a plastic material harder than a material with which said access pipe is made.

* * * * *